United States Patent [19]

Rosenquist

[11] Patent Number: 4,701,516

[45] Date of Patent: * Oct. 20, 1987

[54] COPOLYESTER-CARBONATE RESIN CONTAINING RECURRING DIVALENT UNITS FROM TRIMELLITIC ACID DERIVATIVE

[75] Inventor: Niles R. Rosenquist, Evansville, Ind.

[73] Assignee: General Electric Company, Mt. Vernon, Ind.

[*] Notice: The portion of the term of this patent subsequent to Oct. 29, 2002 has been disclaimed.

[21] Appl. No.: 814,398

[22] Filed: Dec. 30, 1985

[51] Int. Cl.$^4$ .............................................. C08G 63/62
[52] U.S. Cl. ..................... 528/176; 528/125; 528/128; 528/173; 528/174; 528/179; 528/191; 528/193; 528/194
[58] Field of Search ............... 528/176, 128, 125, 173, 528/174, 179, 191, 193, 194

[56] References Cited

U.S. PATENT DOCUMENTS

| | | | |
|---|---|---|---|
| 4,550,155 | 10/1985 | Jones et al. | 528/176 |
| 4,585,851 | 4/1986 | Fox et al. | 528/176 |
| 4,621,130 | 11/1986 | Rosenquist | 528/176 |

*Primary Examiner*—Harold D. Anderson
*Attorney, Agent, or Firm*—Joseph T. Eisele; Martin B. Barancik

[57] ABSTRACT

A thermoplastic polyester-carbonate resin containing in the polymer chain, divalent moieties of the formula:

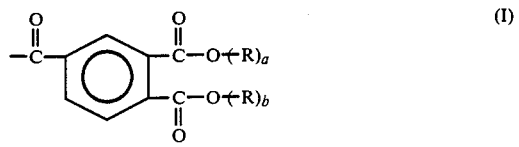

wherein R represents aliphatic hydrocarbyl of from 1 to 9 carbon atoms, inclusive, halogen substituted aliphatic hydrocarbyl of 1 to 9 carbon atoms, inclusive, aralkyl of 7 to 10 carbon atoms, inclusive and halogen substituted aralkyl of 7 to 10 carbon atoms, inclusive; a and b are each whole number integers of from 0 to 1; and the sum of a+b is 1 and wherein there are sufficient linkages of formula I to lower the glass transition temperature of the polymer.

16 Claims, No Drawings

COPOLYESTER-CARBONATE RESIN CONTAINING RECURRING DIVALENT UNITS FROM TRIMELLITIC ACID DERIVATIVE

BACKGROUND OF THE INVENTION

1. Field of the Invention

The invention relates to polycarbonate and copolyester-carbonate resins and more particularly to such resins modified to provide particular physical properties useful for thermoplastic processing.

2. Brief Description of the Prior Art

A wide variety of polycarbonate and copolyester-carbonate resins are known and usefully employed as thermoplastics for a wide variety of molded articles and components of useful articles. In spite of the wide diversity of physical properties associated with the prior art resins, there has remained a need for even more diverse physical properties. The resins of the present invention are noteworthy in that they have lowered glass-transition temperatures while retaining to a significant extent the desirable attributes of thermoplastic molding resins.

SUMMARY OF THE INVENTION

The invention comprises a copolyester-carbonate resin, containing in the polymer chain recurring divalent moieties of the formula:

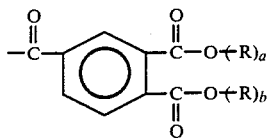
(I)

wherein R is selected from the group consisting of aliphatic hydrocarbyl of 1 to 9 carbon atoms, inclusive, halogen substituted aliphatic hydrocarbyl of 1 to 9 carbon atom, inclusive, aralkyl of 7 to 10 carbon atoms, inclusive and halogen substituted aralkyl of 7 to 10 carbon atoms, inclusive; a and b are each whole number integers of from 0 to 1; and the sum of a+b is 1.

The copolyester-carbonates of the invention are useful as thermoplastic molding compositions. The moldable resins and resin compositions are useful to mold a wide variety of useful articles such as component parts of automobiles, tool housings and like articles.

The invention also comprises thermoplastic polycarbonate and copolyester-carbonate thermosetting molding compositions containing the resins of the invention.

The term "hydrocarbyl" as used herein means the monovalent moiety obtained upon removal of a hydrogen atom from a parent hydrocarbon. Representative of aliphatic hydrocarbyl are alkyl of 1 to 9 carbon atoms, inclusive such as methyl, ethyl, propyl, butyl, pentyl, hexyl, heptyl, octyl, nonyl and isomers thereof; cycloalkyl of 3 to 8 carbon atoms, inclusive, such as cyclopropyl, cyclobutyl, cyclopentyl, cyclohexyl, cycloheptyl, cyclooctyl; alkyl substituted cycloalkyl of 4 to 12 carbon atoms, inclusive, such as 2-methylcyclopropyl, 3,4-dimethylcyclohexyl; alkenyl of 3 to 9 carbon atoms, inclusive, such as allyl, 3-hexenyl, 2,4-pentadienyl; and aralkyl of 7 to 10 carbon atoms, inclusive, such as benzyl, phenethyl, phenpropyl, phenbutyl and the like. Preferred hydrocarbyl groups do not have a hydrogen atom on the carbon β to the oxa atom, for example benzyl and neopentyl.

The term "halogen substituted hydrocarbyl" as used herein means hydrocarbyl as defined above wherein one or more hydrogen atoms have been replaced with a halogen atom.

The term "halogen" as used herein is embracive of chlorine, bromine, iodine and fluorine.

DETAILED DESCRIPTION OF THE PREFERRED EMBODIMENTS OF THE INVENTION

The copolyester-carbonate resins of the invention may be prepared by the reaction of a carbonate precusor, a dihydric phenol, and a dicarboxylic acid or mixture of dicarboxylic acids selected from those of the formula:

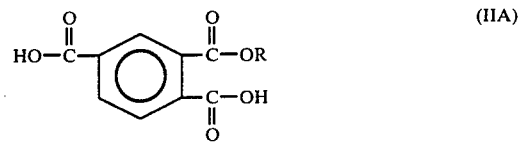
(IIA)

and

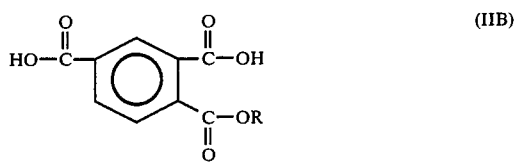
(IIB)

wherein R, is as defined above. The compounds of the formula (IIA) are isomers of the compounds of formula (IIB) and they will be referred to hereinafter collectively as compounds of the formula (II). The reaction is carried out under conditions to produce a copolyester-carbonate resin. Such reaction conditions are well known to those skilled in the art of polycarbonate polymer resins and are described, for example, in the U.S. Pat. Nos. 3,028,365; 3,334,154; 3,275,601; 3,915,926; 3,030,331; 3,169,121; 3,027,814; and 4,188,314. In general, the preparation may be carried out by interfacial polymerization or phase boundary separation, transesterification, solution polymerization, melt polymerization, interesterification, and like processes. Interfacial polymerization is preferred.

Although the preparative processes may vary, several of the preferred processes typically involve dissolving or dispersing the reactants in a suitable water immiscible solvent medium and contacting the reactants with a carbonate precursor, such as phosgene, in the presence of a suitable catalyst and an aqueous caustic solution under controlled pH conditions. The most commonly used water immiscible solvents include methylene chloride, 1,2-dichloroethane, chlorobenzene, toluene, and the like. A molecular weight regulator, that is a chain stopper, is generally added to the reactants prior to or during the contacting of them with a carbonate precursor. Useful molecular weight regulators include, but are not limited to, monohydric phenols such as phenol, chroman-I, paratertiarybutylphenyl, and the like. Techniques for the control of molecular weight are well known in the art and may be used for controlling the molecular weight of the copolyester-carbonate resins of the invention.

The catalysts employed, if an interfacial polymerization technique is used, accelerate the rate of polymerization of the dihydric phenol reactant with the ester precursor such as the dicarboxylic acid and with the carbonate precursor such as phosgene. Suitable catalysts include but are not limited to tertiary amines such as triethylamine, quaternary phosphonium compounds, quaternary ammonium compounds, and the like.

The preferred process for preparing resins of the invention comprises a phosgenation reaction. The temperature at which the phosgenation reaction proceeds may vary from below 0° C., to above 100° C. The phosgenation reaction preferably proceeds at temperatures of from room temperatures (25° C.) to 50° C. Since the reaction is exothermic, the rate of phosgene addition may be used to control the reaction temperature. The amount of the phosgene required will generally depend upon the amount of the dihydric phenol and the amount of dicarboxylic acid present.

Dihydric phenol reactants employed to prepare the copolyester-polycarbonate resins of the invention are generally well known compounds as are methods of their preparation. Representative of such dihydric phenols are phenolic diols of the general formula:

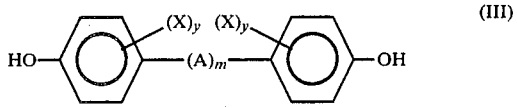

wherein A is selected from the group consisting of a divalent hydrocarbon containing from 1 to about 15 carbon atoms; a halogen substituted divalent hydrocarbon radical containing from 1 to about 15 carbon atoms and divalent groups such as:

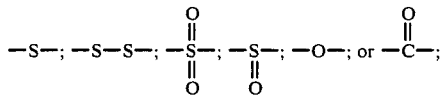

Each X in formula (III) is independently selected from the group consisting of halogen, a monovalent hydrocarbon radical such as an alkyl group of from 1 to about 8 carbon atoms; an aryl group of from 6-18 carbon atoms, an aralkyl group of from 7 to about 14 carbon atoms, an oxyalkyl group of from 1 to about 8 carbon atoms, and an oxyaryl group of from 6 to 18 carbon atoms, and wherein m is zero or 1 and y is a whole number integer of from 0 to 4, inclusive.

Typical of some of the dihydric phenols that are advantageously employed are bis-phenols such as bis (4-hydroxy-phenyl) methane, 2,2-bis(4-hydroxyphenyl)propane (also known as bisphenol A), 2,2-bis(4-hydroxy-3-methylphenyl) propane, 4,4-bis(4-hydroxyphenyl)heptane, 2,2-bis (4-hydroxy-3,5-dichlorophenyl)propane, 2,2-bis (4-hydroxy-3,5-dibromophenol) propane; dihydric phenyl ethers such as bis(4-hydroxyphenyl)ether, bis (3,5-dichloro-4-hydroxyphenyl) ether; dihydroxydiphenols such as p,p'-dihydroxydiphenol, 3,3-dichloro-4,4'-dihydroxydiphenyl; dihydroxyaryl sulfones such as bis(4-hydroxyphenyl) sulfone, bis(3,5-dimethyl-4-hydroxyphenyl)sulfone; dihydroxy benzenes, resorcinol, hydroquinone, halo- and alkyl-substituted dihydroxy benzenes such as 1,4-dihydroxy-2,5-dichlorobenzene, 1,4-dihydroxy-3-methylbenzene; and dihydroxy diphenyl sulfides and sulfoxides such as bis(4-hydroxyphenyl) sulfide and bis(4-hydroxyphenyl) sulfoxide. A variety of additional dihydric phenols are also available and are disclosed in U.S. Pat. Nos. 2,999,835; 3,028,365 and 3,153,008, all of which are incorporated herein by reference. It is, of course, possible to employ two or more different dihydric phenols or a combination of a dihydric phenol with glycol.

Preferred dihydric phenols of Formula (III) are the 4,4'-bisphenols.

The carbonate precursor employed in the preparation of resins of the present invention may be a carbonyl halide, a diarylcarbonate, or a bishaloformate. The carbonyl halides include carbonyl bromide, carbonyl chloride, and mixtures thereof. The bishaloformates include the bishaloformates of dihydric phenols such as bischloroformates of 2,3-bis(4-hydroxyphenyl)propane, hydroquinone, and the like; or the bischloroformates of glycols such as the bischloroformates of ethylene glycol, neopentylene, glycol, polyethylene glycol, and the like. Typical of the diarylcarbonates which may be employed are diphenyl carbonate, and the di(alkylphenyl)-carbonates such as di(tolyl) carbonate. Some other nonlimiting illustrative examples of suitable diarylcarbonates include di(napthyl)carbonate, phenyl tolyl carbonate, and the like.

The preferred carbonate precursors are the carbonyl halides, with carbonyl chloride, also known as phosgene, being the preferred carbonyl halide.

Dicarboxylic acids of the formula (II) given above may be prepared by the reaction of trimellitic anhydride (IV) with an aliphatic alcohol (V) according to the schematic formulae:

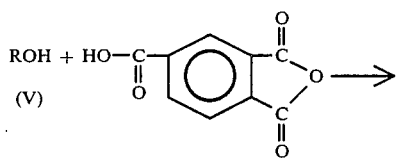

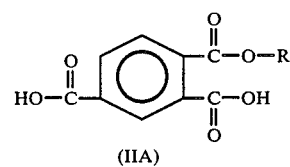

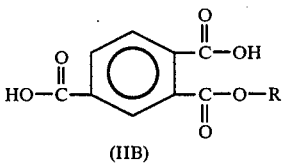

wherein R has the meaning previously ascribed to it.

The above-illustrated reaction for preparation of the isomers of formula (IIA) and (IIB) may be carried out by mixing stoichiometric proportions of the reactants (IV) and (V) and heating the mixture, preferably to a temperature of circa 100° C. to 200° C. either neat or in the presence of an inert organic solvent. The term "inert organic solvent" as used herein means an organic solvent for the product which does not enter into reaction with the reactants (IV) or (V) or adversely affect the desired course of the reaction. Representative of inert organic solvents are methyl ethyl ketone, methyl isobutyl ketone and the like. The general procedure for the preparation of the Compounds (II) may be found, for example, in U.S. Pat. No. 3,578,638.

Aliphatic alcohols of the formula (V) given above are well known compounds as are methods of their preparation. Representative of aliphatic alcohols of the formula (V) are methanol, ethanol, n-propanol, n-butanol, neopentanol, hexanol, 2-ethylhexanol, isooctanol, nonanol, allyl alcohol, cyclopropanol, cyclobutanol, cyclohexanol, cyclooctanol, benzyl alcohol, 2-phenylethanol, 4-tert-butyl-cyclohexanol, trifluoroethanol and the like.

In addition to the dicarboxylic acids of formula (II) given above, the polyester-carbonate resins of the invention may optionally contain reaction residues of other difunctional carboxylic acids, conventionally used in the preparation of copolyester-polycarbonate resins. In general, any difunctional carboxylic acid conventionally used in the preparation of linear polyesters may optionally be utilized in the preparation of the copolyester-carbonate resins of the instant invention in addition to the dicarboxylic acids of the formula (II) given above. Generally, the difunctional carboxylic acids which may be optionally utilized include the aliphatic carboxylic acids, the aromatic carboxylic acids, and the aliphatic-aromatic carboxylic acids. These acids are well known and are disclosed for example in U.S. Pat. No. 3,169,121, which is hereby incorporated herein by references. Representatives of such difunctional carboxylic acids are difunctional carboxylic acids of the formula:

$$R^1 — R^2)_q COOH \qquad (VI)$$

wherein $R^2$ is an alkylene, alkylidene, or cycloaliphatic group; an alkylene, alkylidene or cycloaliphatic group containing ethylenic unsaturation; an aromatic group such as phenylene, biphenylene, and the like; two or more aromatic groups connected through non-aromatic linkages such as alkylene or alkylidene groups; and a divalent aralkyl radical such as tolylene, xylylene, and the like. $R^1$ is either a carboxyl or a hydroxyl group. The letter q represents one where $R^1$ is a hydroxyl group and either zero or one where $R^1$ is a carboxyl group.

Preferred difunctional carboxylic acids optionally employed are the aromatic dicarboxylic acids. Particularly useful aromatic dicarboxylic acids are those represented by the general formula:

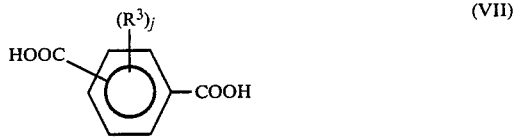

wherein j is a positive whole integer having a value of from 0 to 4 inclusive; and each $R^3$ is independently selected from the group consisting of alkyl radicals, preferably lower alkyl radicals containing from 1 to about 5 carbon atoms.

Mixtures of these optional difunctional carboxylic acids may be employed as well as single acids. Therefore, where the term difunctional carboxylic acid is used herein it is to be understood that this term includes mixtures of two or more different difunctional carboxylic acids as well as individual carboxylic acids.

Most preferred optional aromatic dicarboxylic acids are isophthalic acid, terephtalic acid, and mixtures thereof. A particularly useful difunctional carboxylic acid comprises a mixture of isophthalic acid and terephthalic acid wherein the weight ratio of terephthalic acid to isophthalic acid is in the range of from about 1:10 to about 0.2:9.8.

Rather than utilizing the optional difunctional carboxylic acid per se, it is possible, and sometimes even preferred, to employ the reactive derivatives of said acid. Illustrative of these reactive derivatives are the acid halides. The preferred acid halides are the acid dichlorides and the acid dibromides. Thus, for example, instead of using isophthalic acid, terephthalic acid, or mixtures thereof, it is possible to employ isophthaloyl dichloride, terephthaloyl dichloride, and mixtures thereof.

Also included within the scope of the instant invention are randomly branched copolyester-carbonate resins wherein a minor amount (typically between 0.05 and 2 mole percent, based on the quantity of dihydric phenol used) of a polyfunctional aromatic compound is a co-reactant with the dihydric phenol in the reaction mixture, comprising also the carbonate precursor and the ester precursor, to provide a thermoplastic randomly branched copolyester-carbonate. These polyfunctional aromatic compounds may be hydroxyl, carboxyl, carboxylic anhydride, haloformyl, or mixtures thereof. Some illustration non-limiting examples of these polyfunctional compounds include trimellitic anhydride, trimellitic acid, trimellityl trichloride, 4-chloroformyl phthalic anhydride, pyromellitic acid, pyromellitic dianhydride, mellitic acid, mellitic anyhdride, trimesic acid, benzophenonetetracarboxylic acid, benzophenonetetracarboxylic acid anhydride, and the like. Other organic polyfunctional compounds useful in making these randomly branched copolyester-carbonates are disclosed in U.S. Pat. Nos. 3,635,895 and 4,001,184, both of which are incorporated herein by reference.

The proportions of reactants employed to prepare the copolyester-carbonate resins of the invention will vary in accordance with the proposed use of the product resin. Sufficient dicarboxylic acid(s) of Formula II should be present to lower the glass transition temperature (Tg) in comparison to the corresponding polycarbonate. Thus, if only dicarboxylic acid(s) of Formula II are employed, a mole percent ester linkage of at least about 2%, preferably 5%, should be employed. When 5 moles of bisphenol A reacts with 4.75 moles of phosgene and 0.25 moles of dicarboxylic acid of Formula II a copolyestercarbonated with 5 % of ester bonds is formed.

As will be appreciated from the above description, the copolyester-carbonate resins of the invention containing divalent moieties of the formula (I) given above will comprise recurring carbonate moieties of the formula:

and carboxylate groups of the formula:

(X)

When the optional difunctional carboxylic acids such as those of the formula (VI) given above are not employed in the preparation of the resins of the invention, preferred polymer resins of the invention will contain recurring chain units of the formula:

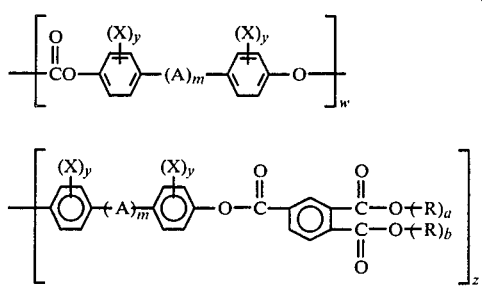
(XI)

wherein A, X, R, m, y, a and b are as defined above; z and w are integers such that w/z is generally from 50/1 to 1/9.

When the optional difunctional carboxylic acids such as those of the formula (VI) given above are employed in this invention, the resins of the invention will also preferably contain in the polymer chain, ester moieties, such as those of the formula:

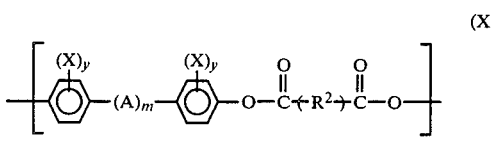
(XII)

wherein $R^2$, A, X, m and y are as previously defined.

These copolyester-carbonate polymers contain, as stated above, ester and carbonate bonds in the polymer chain. The amount of the ester bonds may be from about 5 to about 90 mole percent, preferably from about 35 to about 80 mole percent, relative to the carbonate bonds. For example, 5 moles of bisphenol-A reacting completely with 4 moles of isophthaloyl dichloride and 1 mole of phosgene would give a copolyester-carbonate of 80 mole percent ester bonds as shown in the formula XIII shown above.

The resins of the invention may be employed as the base for thermoplastic molding compositions, compounded with conventional molding aids such as, for example, antioxidants; antistatic agents; inert fillers such as glass, talc, mica, and clay; ultraviolet radiation absorbers such as the benzophenones, benzotriazoles, and the like; hydrolytic stabilizers such as the epoxides disclosed in U.S. Pat. Nos. 3,489,716, 4,138,379 and 3,839,247, all of which are incorporated herein by reference; color stabilizers such as the organophosphites; thermal stabilizers such as phosphite; flame retardants; and mold release agents.

Some particularly useful flame retardants are the alkali and alkaline earth metal salts of sulfonic acids. These types of flame retardants are disclosed in U.S. Pat. Nos. 3,933,734; 3,931,100; 3,978,024; 3,948,851; 3,926,980; 3,919,167; 3,909,490; 3,953,396; 3,953,300; 3,917,559; 3,951,910 and 3,940,366, all of which are hereby incorporated herein by reference.

Sufficiently activated R groups, for example, halogenated alkyl, preferably trifluoroethyl, will undergo ester exchange reaction with ester or carbonate linkages present in a second polymer chain. A crosslinked product will be formed. A catalytic proportion of a transesterification catalyst should be present. A catalytic proportion is generally one within the range of from about 0.01 to about 0.00001 parts by weight of the composition. Transesterification catalysts useful as ingredients of the thermosetting compositions of the invention are basic catalysts conventionally employed in transesterification reactions. Representative of such catalysts are oxides, hydrides, hydroxides or amides of alkali or alkaline earth metals such as, for example, lithium hydroxide and the like. Also, basic metal oxides such as zinc oxide, and the like. Also representative of transesterification catalysts are salts of weak acids such as lithium stearate; organotitanium catalysts such as tetraoctyltitanate; organotin catalysts such as dibutyltin oxide; aluminum or boron anion containing catalysts such as those described in U.S. Pat. Nos. 4,330,669 and 4,395,062 and the like.

In general, the temperature required to achieve crosslinking is one within the range of from about 200 to about 300° C. for a period of from about 5 to about 30 minutes.

The crosslinked compositions of the invention are expected to exhibit improvements in certain physical properties such as heat resistance, solvent resistance and thermal creep resistance.

The following examples and preparations describe the manner and process of making and using the invention and set forth the best mode contemplated by the inventor of carrying out the invention but are not to be construed as limiting the invention. Where reported, the following tests were carried out.

Glass Transition Temperature

The glass transition temperatures were determined by using a Perkin-Elmer DSC-2B instrument which measures the glass transition temperature or Tg by differential scanning calorimetry.

Intrinsic Viscosity

The intrinsic viscosity was measured at a temperature of 25° C. in methylene chloride and is reported in deciliters/gram (dl/g).

Preparation 1

To a suitable reaction vessel there is charged equimolar proportions of trimellitic anhydride and benzyl alcohol in methyl isobutyl ketone. The charge is heated to reflux temperature (circa 150° C.) for about 60 minutes. At the end of this time period an aliquot of the reaction mixture shows an absence of anhydride by infra-red analysis. The solvent is removed under vacuum to obtain a white powder which is the benzyl ester of 1,2,4-benzene tricarboxylic acid (infrared absorption at 1735 cm$^{-1}$ and 1705 cm$^{-1}$).

Preparation 2

The procedure of Preparation 1, supra., is repeated except that the benzyl alcohol as used therein is replaced with an equal proportion of allyl alcohol, neopentyl alcohol, isopropyl alcohol, cyclohexanol, or 4-tert-butylcyclohexanol, respectively, to obtain the corresponding ester of 1,2,4-benzene tricarboxylic acid.

Preparation 3

The procedure of Preparation 1, supra., is repeated except that excess of methanol was used in place of the solvent solution of benzyl alcohol. The mixture was heated to reflux temperature in a 100° C. oil bath for 30 minutes to obtain the methyl ester of 1,2,4-benzenetricarboxylic acid.

Preparation 4

The procedure of Preparation 1, supra., is repeated except that a 1.5 molar excess of trifluoroethanol is used in place of the solvent solution of benzyl alcohol. The mixture is heated to reflux temperature in a 130° C. oil bath of 24 hours to obtain the trifluoroethyl ester of 1,2,4-benzenetricarboxylic acid.

EXAMPLE 1

(Comparative Example)

This example is not an example of the invention but is made for comparative purposes.

A 1000 ml four neck flask was fitted with a mechanical stirrer, a pH probe, an aqueous caustic inlet tube and a Claisen adapter to which was attached a dry ice condenser and a gas inlet tube. To the flask was added 280 ml water, 350 ml methylene chloride, 1.4 ml triethyl amine (0.01 mole) and 57 g (0.25 mole) bisphenol-A. With stirring, phosgene was introduced into the flask at a rate of 1g/min. for 30 minutes with the pH maintained in a range of 10 to 11 by addition of 25% aqueous sodium hydroxide. The resin layer was then separated from the brine layer, washed with 3 wt. percent aqueous HCl until washing remained acidic, then twice with distilled water. The resin was then precipitated into 1500 ml. of methanol in a Waring blender and washed with 500 ml more methanol.

EXAMPLE 2

Preparation of a 10 mole percent polycarbonate copolymer with the mono benzyl ester of 1,2,4-benzenetricarboxylic acid.

A 1000 ml four neck flask was fitted with a mechanical stirrer, a pH probe, and aqueous caustic inlet tube and a Claisen adapter to which was attached a dry ice condenser and a gas inlet tube. To the flask was added 280 ml water, 350 ml methylene chloride, 1.4 ml triethyl amine (0.01 mole), 57 g (0.25 mole) bisphenol-A, 0.85 g (0.009 mole) phenol and 7.45 g (0.025 mole, 10 mole %) of the monobenzyl ester of 1,2,4-benzenetricarboxylic acid. With stirring, phosgene was introduced into the flask at a rate of 1 g/min. for 10 minutes with the pH maintained in a range of 6 to 8 by addition of 25% aqueous sodium hydroxide. The pH was then raised to the range of 10 to 11 and maintained in that range while phosgene was introduced at 1g/min. for an additional 30 minutes. The resin layer was then washed and the resin isolated as in Example 1.

EXAMPLES 3-13

The procedure of Example 2, supra., is repeated except that there is also included in the reaction vessel charge in place of the monobenzyl ester of 1,2,4-benzenetricarboxylic acid a proportion of an ester of 1,2,4-benzenetricarboxylic acid prepared in accordance with one of the Preparations 2-4, supra. In some examples, the proportion of phenol charge is also reduced. The phosgenation is also carried out for a variety of different times and under differing pH conditions. The ester employed, the proportions charged, the pH ranges and the reaction times are given in the following Table with the intrinsic viscosity and the Tg determined for each resin.

TABLE

| Example | O—R | Mole % - OR | Mole % Phenol | Reaction Conditions for 1 g/min. Phosgene Addition[1] | | IV | Tg (°C.) |
| | | | | pH | Time | | |
| --- | --- | --- | --- | --- | --- | --- | --- |
| 1. | none - control | — | 3.7% | 10 to 11 | 30 | 0.491 | 150.7 |
| 2. | 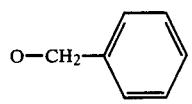 (benzyl) | 10% | 3.7% | 6 to 8<br>10 to 11 | 10<br>30 | 0.492 | 142.7 |
| 3. | Same | 20% | 3.7% | 6 to 8<br>10 to 11 | 15<br>20 | 0.513 | 137.3 |
| 4. | 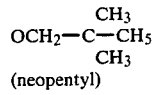 (neopentyl) | 10% | 3.7% | 6 to 8<br>10 to 11 | 10<br>25 | 0.430 | 147.9 |
| 5. | Same | 20% | 3.7% | 6 to 8<br>10 to 11 | 15<br>20 | 0.435 | 149.3 |
| 6. | 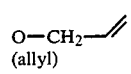 (allyl) | 10% | 3.7% | 6 to 8<br>10 to 11 | 10<br>25 | 0.537 | 148.2 |
| 7. | Same | 20% | 3.7% | 6 to 8<br>10 to 11 | 15<br>20 | 0.547 | 144.9 |

TABLE-continued

| Example | O—R | Mole % - OR | Mole % Phenol | Reaction Conditions for 1 g/min. Phosgene Addition[1] | | IV | Tg (°C.) |
|---|---|---|---|---|---|---|---|
| | | | | pH | Time | | |
| 8. | 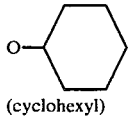 (cyclohexyl) | 20% | 2.5% | 6 to 8<br>10 to 11 | 15<br>30 | 0.500 | 140.4 |
| 9. | 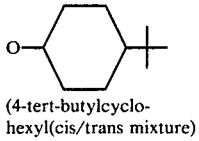 (4-tert-butylcyclohexyl(cis/trans mixture) | 20% | 2.5% | 6 to 7<br>9 to 10 | 15<br>20 | 0.496 | 137.6 |
| 10. | Same | 50% | 2.0% | 6.5 to 7.5<br>9 to 10 | 85[1]<br>63 | 0.681 | 126.8 |
| 11. | OCH$_2$CF$_3$ (trifluoroethyl) | 5% | 3.7% | 6 to 8<br>10 to 11 | 5<br>30 | 0.483 | 147.1 |
| 12. | O—CH$_3$ (methyl) | 5% | 3.7% | 6 to 8<br>10 to 11 | 5<br>30 | 0.452 | 150.3 |
| 13. | 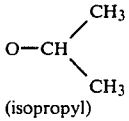 (isopropyl) | 20% | 2.5% | 6 to 8<br>10 to 11 | 15<br>30 | 0.548 | 142.0 |

[1]All reactions run at 1 g/min phosgene addition rate except the 50 mole percent tert butyl cyclohexyl ester resin which had phosgene addition at 0.3 g/min. 150 ml additional methylene chloride was also added to that batch during the reaction.

As may be seen from the above Table, the Tg value of each resin of the invention (Examples 2–13) were generally 1 to 10° C. lower than the control (Example 1) while the intrinsic viscosity of all of the resins, including the control are substantially similar.

EXAMPLE 14

In the reaction apparatus described in Example 1 were first mixed 2.92 g (0.1 mole) of the monotrifluoroethyl ester of trimellitic acid, 600 ml of CH$_2$CL$_2$, 1.4 ml triethylamine and 2.0 ml dimethylformamide. With stirring, phosgene was introduced into the flask for 5 minutes at 1g/min. The mixture was then stirred for an additional 5 minutes. To the flask was then added 45.6 g (0.2 mole) of bisphenol-A, 0.15 g (.001 mole) t-butylphenol, and 400 ml water. Phosgene was then added at 1 g/min. for 34 minutes with pH maintained at 9 to 10. The resin layer was then washed and the resin isolated as in Example 1. The resin exhibited an intrinsic viscosity of 0.998.

EXAMPLE 15

2.5 g (0.01 mole) of the resin of Example 14, supra., was dissolved in 10 ml methylene chloride. 0.0019 g (0.000005 mole) of (CH$_3$)$_4$NBα$_4$ was added, and dispersed as a fine suspension in the solution. The solvent was then stripped off by drying the solution in an oven at 110° C.

The resultant sample was then placed in a 1.5 inch diameter circular compression mold, heated to 247° C. and held at 247–252° C. for 20 minutes.

A 1.35 g sample of the resultant disk was then placed in 40 ml CH$_2$Cl$_2$. The disk swelled and kept its shape substantially. After exhaustive washing with methylene chloride, the gel portion was isolated and dried and found to be 70% by weight of the original sample.

What is claimed:

1. A thermoplastic polyester-carbonate resin containing in the polymer chain, divalent moieties of the formula:

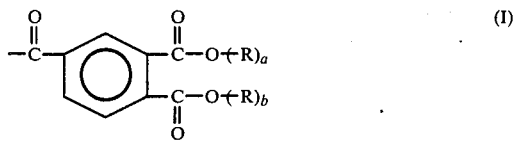

(I)

wherein R represents aliphatic hydrocarbyl of from 1 to 9 carbon atoms, inclusive, halogen substituted aliphatic hydrocarbyl of 1 to 9 carbon atoms, inclusive, aralkyl of 7 to 10 carbon atoms, inclusive or halogen substituted aralkyl of 7 to 10 carbon atoms, inclusive; a and b are each whole number integers of from 0 to 1; and the sum of a+b is 1 and wherein there are sufficient linkages of formula I to lower the glass transition temperature of the polymer.

2. The resin of claim 1 wherein said moiety of formula I comprises at least about 2% of the linkages in the polymer chain.

3. The resin of claim 1 which contains in the polymer chain repeating units of the formula:

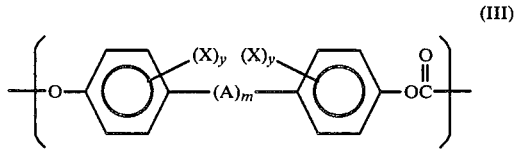

(III)

wherein R is as defined in claim 1; A is selected from the group consisting of a divalent hydrocarbon radical containing from 1 to about 15 carbon atoms; a halogen substituted divalent hydrocarbon radical containing from 1 to about 15 carbon atoms;

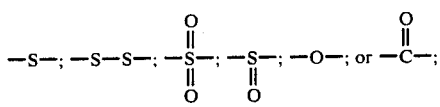

and wherein each X is independently selected from the group consisting of halogen, a monovalent hydrocarbon radical of from 1 to about 8 carbon atoms; an aryl group of from 6–18 carbon atoms, an aralkyl group of from 7 to about 14 carbon atoms, an oxyalkyl group of from 1 to about 8 carbon atoms, and an oxyaryl group of from 6 to 18 carbon atoms; and wherein m is zero or 1 and y is a whole number integer of from 0 to 4.

4. The composition in accordance with claim 1 wherein aliphatic hydrocarbyl is from 1 to about 6 carbon atoms, inclusive.

5. The resin of claim 1 wherein R represents aliphatic hydrocarbyl of 1 to 6 carbon atoms, inclusive.

6. The resin of claim 1 wherein R represents halogen substituted hydrocarbyl of 1 to 9 carbon atoms, inclusive.

7. The resin of claim 1 wherein R represents aralkyl of 7 to 10 carbon atoms, inclusive.

8. The resin of claim 1 wherein R represents halogen substituted aralkyl of 7 to 10 carbon atoms, inclusive.

9. The resin of claim 1 wherein R is benzyl.

10. The resin of claim 1 wherein R is neopentyl.

11. The resin of claim 1 wherein R is alkyl.

12. The resin of claim 1 wherein R is cyclohexyl.

13. The resin of claim 1 wherein R is 4-tert-butylcyclohexyl.

14. The resin of claim 1 wherein R is trifluoroethyl.

15. The resin of claim 1 wherein R is methyl.

16. The resin of claim 1 wherein R is isopropyl.

* * * * *